July 21, 1931. C. R. ENGLUND 1,815,246
RADIO DIRECTION FINDER
Filed June 29, 1929
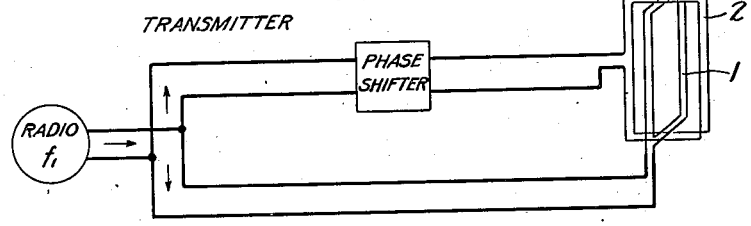
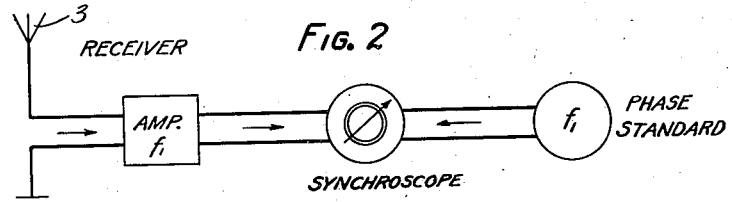
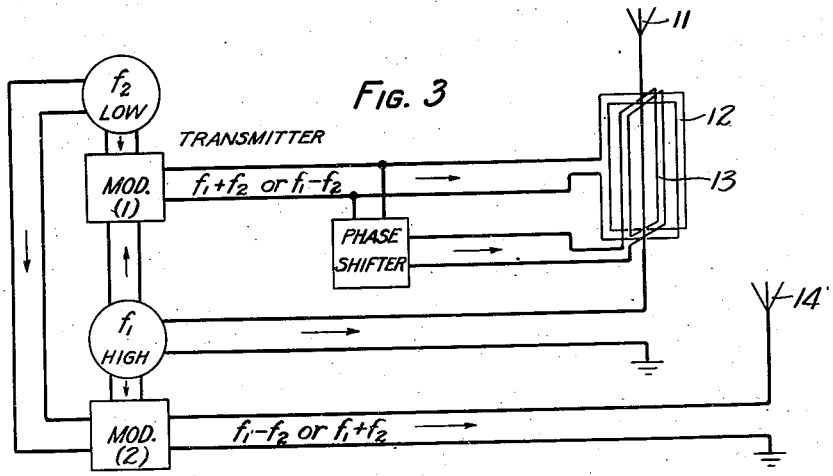
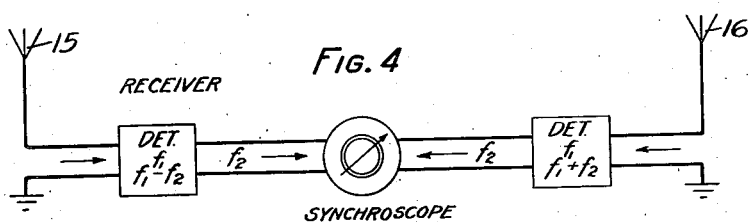
INVENTOR
C. R. ENGLUND
BY
Guy T. Morris
ATTORNEY Patented July 21, 1931

1,815,246

UNITED STATES PATENT OFFICE

CARL R. ENGLUND, OF FREEHOLD, NEW JERSEY, ASSIGNOR TO BELL TELEPHONE LABORATORIES, INCORPORATED, OF NEW YORK, N. Y., A CORPORATION OF NEW YORK

RADIO DIRECTION FINDER

Application filed June 29, 1929. Serial No. 374,655.

This invention relates to methods of, or systems for, radio direction finding. It perhaps has its greatest utility in defining the course of a mobile station, for example, an airplane, and for guiding such station along the course defined.

Copending application of P. H. Evans and J. W. Greig, Serial No. 362,900, filed May 14, 1929, assigned to my assignee, discloses and claims subject matter generic to this patent.

In the art of radio direction finding, it has been common to employ communicating means between a mobile station and one or more fixed stations, involving the use of either a transmitter or a receiver at the mobile station to determine by triangulation the instantaneous position of the mobile station with respect to these fixed stations and therefore to enable a course to be set. While such means may insure the ultimate progress of a mobile station to its objective, it does not insure that such progress shall be in a direct line. Therefore, while in most instances such means are reasonably effective for the navigation of ships at sea where relative movements may easily be measured, they are not so effective in air navigation, which is attended by relatively large side drift due to atmospheric currents which cannot easily be measured or corrected for.

It has accordingly resulted that for air navigation especially, it has become practically necessary to use a directive method or system in which paths may be fixed definitely with relation to the earth, thus eliminating dependence on momentary direction determination. These paths constitute reference lines or patterns which define courses for the mobile station. A simple method of radio guidance of this kind, in use at present, involves localized transmitting apparatus, and the course is a radio line extending from the transmitter. A requirement in a radio method or system for defining a course and for guiding an object along it, whether of the above, or of other type within the same broad classification, naturally involves a means whereby a positive indication is obtained when the mobile station is in its course and showing, by a change in its indication, in sense and amount, any deviation from the course. The receiving circuit in the mobile station should also be adjustable so that any desired course relative to those determined by the reference pattern may be set on the indicator.

In the method or system above described, the discrimination between "ether" areas comprised between the lines of the pattern and those areas which are contiguous to the lines, is based on the relative amplitude characteristics of the waves received in these respective areas, that is, on the directive characteristics of the transmitting station. Applicant conceived the idea of a somewhat similar method, but using phase instead of amplitude, discrimination, and certain inherent advantages in the same.

It is the principal object of the invention to provide means for fixing a desired course more effectively than by prior methods or means, and for following such course with less deviation.

In its simplest form the method involves the use at the mobile receiving station of a phase standard wave having the same frequency as that of the beacon wave. This wave is adjustable both as to phase and amplitude so that, with respect to the indicator in the output circuit of the receiver, in which such local wave and beacon wave are combined, a "zero input" line may be determined. Any deviation from this line would immediately be indicated by a resultant output from a receiver. Since a progressive change of instantaneous phase, with respect to points in an arc of a circle circumscribed about the beacon station, (which condition defines the requisite phase variation) implies or attends a rotating field set up by the beacon station, or at least a field which continuously traverses the general area in which the receiver is to move, the principle of the invention is in a sense distinctly different from that of the previous methods in the same general class, an example of which has been described, and which are principally characterized by the employment of a fixed radio pattern localed over the earth's surface. Since the present invention is not dependent on any ich fixed pattern, there is no limitation as to the course which may be set toward the objective, while preserving the benefits of the full indication principle, this being a distinct advantage over prior systems. The operation of the method of the invention is also characterized by an inherently more sensitive response to deviations of the mobile receiving station from the set course than by the operation of methods depending upon amplitude discrimination. This means that the mobile receiving station is able to follow its set course with less deviation.

Other objects of the invention are therefore to provide methods and means whereby a mobile receiving station may more unerringly set and follow a desired course, and with less sacrifice of accuracy and of sensitivity depending on the choice of courses, than may be achieved by prior methods and means.

In one form of the invention, in order to avoid difficulties in synchronizing the beacon wave and the phase standard wave, the phase variation in the beacon wave may be translated into, and made use of in, a reproduced modulating component of it, the same modulations being impressed on an independently radiated wave at the beacon station and when reproduced at the mobile receiving station, used as the phase standard wave. Observations may be facilitated by giving the modulating wave an audible frequency, so that, for example, a telephone receiver can be used as the indicating instrument.

In the drawings Fig. 1 shows a transmitting station at a fixed point;

Fig. 2 shows a receiving station which may be located on an airship or other mobile object;

Fig. 3 shows another form of transmitting station at a fixed point; and

Fig. 4 shows another form of receiving station which may also be located on a mobile object.

In the circuit of Fig. 1 a wave of radio frequency is generated in the generator marked "Radio $f_1$" and is fed into a loop antenna 1. Connected to the output of the oscillation generator in parallel to the loop antenna 1 is a phase shifter in which the current received by the device is shifted in phase 90°. The output of the device is connected to a second loop antenna 2 which is crossed with respect to the first loop antenna.

The circuit of Fig. 1 broadcasts a wave which has an asymmetrical phase characteristic, and may be called a rotating wave. That is, if the broadcasting station were circumnavigated during the interval of one cycle, at any given radius, and at a fixed speed, in the direction of the rotation of the field, the wave received during the journey would not change in phase.

In Fig. 2 an antenna 3 receives the asymmetrical wave broadcast from the crossed loops shown in Fig. 1. This wave is amplified in an amplifier "Amp. $f_1$" and fed into a synchroscope or other phase indicating device. Connected to the synchroscope is a phase standard oscillation generator $f_1$ which generates a wave of the same frequency as the received wave incident on the antenna 3. At any instant of comparison of the two waves received by the synchroscope there will be a definite phase relationship indicated between them. If the mobile receiving station is traveling in a straight line toward the transmitting station, this phase relationship will remain constant, and the phase indicating device will show no change in the indication. However, if the mobile receiving station gets off the direct course to the transmitter, the beacon wave received from the transmitting station will be received in a different phase relationship with respect to the reference standard wave generated locally and the synchroscope will indicate this change, thus giving an indication that the mobile receiving station is off its course, and enabling the pilot to make the necessary adjustment of his direction of motion.

Any suitable method or means may be used for generating the beacon wave at the transmitting station and the phase reference wave at the receiving station. At present the most satisfactory means of obtaining a wave of standard frequency is the use of a quartz crystal to control the frequency of oscillations, with suitable provision for maintaining the crystal at a constant temperature. Such devices have been used for synchronizing apparatus in picture transmission and television to obviate the necessity of transmitting a synchronizing wave between the sending and receiving stations.

It may be desired to avoid the necessity of having a wave generating device on the mobile receiving station, particularly if the receiving station is located on an airship, in which case weight is an important factor. If means are provided at the transmitting station for broadcasting a phase standard wave as well as a beacon wave, and means are provided at the receiving station for receiving both of these waves and comparing their phase relationship, the necessity for a wave generator at the receiving station will be obviated. If the beacon wave and reference wave are derived from the same source, moreover, there will be no danger of a false indication due to variations in the frequency of these waves.

The beacon wave and the reference wave must be broadcast on different wave lengths, however, so that they may be separately received for comparison purposes. It follows that the waves used must be so chosen with respect to the various functions they are to perform that they will not affect the indication. That is, the carrier waves must not affect the phase relation of the waves to be compared at the point of reception.

In Fig. 3 there is shown a transmitting station which accomplishes this result. A generator "$f_1$ High" of a wave of radio frequency $f_1$ supplies this wave to a vertical antenna 11, located centrally with respect to a pair of crossed loop antennæ 12, 13. Waves from the generator $f_1$ are also supplied to a modulating device "Mod. (1)" where they are modulated with waves of a low frequency $f_2$ impressed thereon from a low frequency oscillation generator "$f_2$ Low". The carrier and one side band are suppressed in the modulating device and the modulation component of frequency $f_1+f_2$ or $f_1-f_2$ is fed into the crossed loop antennæ 12, 13, the wave fed into loop antenna 13 being first passed through a phase shifting device "Phase shifter" where its phase is shifted 90° with respect to the wave fed into loop 12. Waves from the oscillation generators $f_1$ and $f_2$ are also intermodulated in a second modulating device "Mod. (2)", the carrier and one side band (the one alternative to that suppressed by "Mod. (1)") are suppressed, and the other side band is fed into a non-directive antenna 14, which is located in proximity to the crossed loops and central antenna, but not necessarily in any fixed location with respect thereto. Of course, the functions of the two modulators may be combined in a single modulator having a divided output circuit.

In Fig. 4 is shown diagrammatically apparatus for receiving the waves broadcast from the transmitting apparatus of Fig. 3 and obtaining the desired indication therefrom. The rotating wave of frequency $f_1-f_2$ is received on an antenna 15 and impressed with the wave of frequency $f_1$ on a detector "Det. $f_1-f_2$". Low frequency wave $f_2$ in the output of the detector will have the rotating characteristic of the wave of frequency $f_1-f_2$ broadcast from the transmitting station. This wave of frequency $f_2$ is then used as the beacon wave and is impressed on a synchroscope or other phase indicating device. The wave of frequency $f_1+f_2$ is received on a second antenna 16 (or on the first antenna if it is receptive to waves of two different frequencies) and is impressed together with the wave of frequency $f_1$ on a detector "Det. $f_1+f_2$" in which the wave of low frequency $f_2$ is detected. This wave will have a symmetrical phase characteristic with respect to all the points equidistant from the transmitting antenna, and may now be used as a standard reference wave. This wave of frequency $f_2$ is also impressed on the synchroscope, which gives an indication of the phase relationship of the two waves of frequency $f_2$ and enables the pilot to direct his course in a straight line toward the transmitting station. It is of course necessary that the two receiving antennæ have sufficient resolving power to discriminate between frequencies $f_1-f_2$ and $f_1+f_2$.

What is claimed is:

1. In combination, a pair of crossed loop antennæ, a non-directional antenna located centrally with respect to said loops, a second non-directional antenna, means for generating a wave of radio frequency, means for generating a wave of low frequency, means for intermodulating said waves, means for transmitting one side band of said intermodulated wave as a rotating wave from said crossed loop antennæ, means for transmitting said wave of radio frequency from said central non-directional antenna, and means for transmitting the other side band of said intermodulated waves from said second non-directional antenna.

2. In combination, means for transmitting a rotating wave as a side band of a modulated carrier wave, means for transmitting a reference wave as the other side band of said modulated carrier wave and means for receiving and intercomparing the phase relationship of said rotating wave and said reference wave.

3. The method of direction finding by radio which comprises generating a high frequency wave and a low frequency wave, intermodulating said waves, transmitting one side band of said modulated wave as a rotating wave, transmitting the other side band of said modulated wave as a non-rotating wave, separately receiving and detecting said side bands and intercomparing the phase characteristics of said detected waves.

In witness whereof, I hereunto subscribe my name this 18th day of June, 1929.

CARL R. ENGLUND.